(12) United States Patent
Huang et al.

(10) Patent No.: US 11,344,887 B2
(45) Date of Patent: May 31, 2022

(54) MICROFLUIDIC CHIP AND CONTROL METHOD THEREOF, DROPLET GENERATION DEVICE, AND MICROSPHERE PREPARATION DEVICE

(71) Applicant: REVOTEK CO., LTD, Sichuan (CN)

(72) Inventors: Yushi Huang, Chengdu (CN); Yaya Zhang, Chengdu (CN)

(73) Assignee: REVOTEK CO., LTD, Sichuan (CN)

( * ) Notice: Subject to any disclaimer, the term of this patent is extended or adjusted under 35 U.S.C. 154(b) by 227 days.

(21) Appl. No.: 16/228,326

(22) Filed: Dec. 20, 2018

(65) Prior Publication Data
US 2019/0224670 A1    Jul. 25, 2019

(30) Foreign Application Priority Data

Dec. 25, 2017    (CN) .......................... 201711416785.0

(51) Int. Cl.
*B01L 3/00* (2006.01)
*B01J 13/06* (2006.01)

(52) U.S. Cl.
CPC ........... *B01L 3/50273* (2013.01); *B01J 13/06* (2013.01); *B01L 3/502746* (2013.01);
(Continued)

(58) Field of Classification Search
CPC .... B01L 3/50273; B01L 3/5027; B01L 3/502; B01L 3/50; B01L 3/00; B01L 3/06;
(Continued)

(56) References Cited

U.S. PATENT DOCUMENTS 9,295,988 B2 *   3/2016   Henry .................... B01L 3/5027
2010/0022680 A1 * 1/2010   Karnik ................ B01F 11/0071
                                                            523/105
(Continued)

FOREIGN PATENT DOCUMENTS

CN        101533005 A      9/2009
CN        105524829 A      4/2016
CN        105641743 A      6/2016

OTHER PUBLICATIONS

Micronit, Micronit Micorfluidics: A Guide to Droplet Generation, Micronit Microfluidics, 2014, pp. 1-10, accessed on Aug. 31, 2020, https://store.micronit.com/3-pack-focused-flow-droplet-generators-479. (Year: 2014).*

(Continued)

*Primary Examiner* — Christine T Mui
(74) *Attorney, Agent, or Firm* — Cantor Colburn LLP

(57) ABSTRACT

The present disclosure relates to a microfluidic chip and a control method thereof, a droplet generation device and a microsphere preparation device. The microfluidic chip includes a matrix (3), and a first flow channel (1) and a second flow channel (2) provided in the matrix (3), wherein the first flow channel (1) and the second flow channel (2) intersect to form an intersection area, sheared phase fluid can flow in from the first flow channel (1), shearing phase fluid can flow in from the second flow channel (2) so as to separate the sheared phase fluid into discrete droplets in the intersection area, and the cross-sectional areas of the first flow channel (1) and the second flow channel (2) range from 0.1 mm$^2$ to 1 mm$^2$. The microfluidic chip can increase the flow rate and improve the efficiency of forming droplets; and the efficiency of generating the droplets is increased on the basis of ensuring the cell activity in order to meet the requirements of 3D biological printing.

18 Claims, 4 Drawing Sheets

(52) U.S. Cl.
CPC ..... *B01L 3/502784* (2013.01); *B01L 2200/12* (2013.01); *B01L 2300/0816* (2013.01); *B01L 2300/0861* (2013.01); *B01L 2400/02* (2013.01); *B01L 2400/0481* (2013.01); *B01L 2400/086* (2013.01)

(58) Field of Classification Search
CPC .... B01L 3/02; B01L 2200/12; B01L 2200/00; B01L 2300/0816; B01L 2300/0809; B01L 2300/08
USPC .......... 422/505, 504, 502, 501, 500
See application file for complete search history.

(56) References Cited

U.S. PATENT DOCUMENTS

| | | | | |
|---|---|---|---|---|
| 2010/0027372 | A1* | 2/2010 | Ozawa | B01F 3/0807 366/341 |
| 2011/0151578 | A1* | 6/2011 | Abate | B01L 3/502784 436/180 |
| 2011/0223314 | A1* | 9/2011 | Zhang | B01J 13/14 427/2.1 |
| 2019/0175516 | A1* | 6/2019 | Segers | A61K 9/127 |

OTHER PUBLICATIONS

Microfluiid Droplet Generators, Micronit Microfluidics: Microfluiid Droplet Generators, Micronit Microfluidics, 2014, pp. 1-6, accessed on Aug. 31, 2020, https://store.micronit.com/3-pack-focused-flow-droplet-generators-479. (Year: 2014).*

Micronit, Example Chip Drawing, Micronit Microfluidics BV, 2014, p. 1, accessed on Aug. 31, 2020 on https://store.micronit.com/3-pack-focused-flow-droplet-generators-479. (Year: 2014).*

Odera, Droplet formation behavior in a microfluidic device fabricated by hydrogel molding, Microfluid Nanofluid, 2014, 17:469-476. (Year: 2014).*

* cited by examiner

MICROFLUIDIC CHIP AND CONTROL METHOD THEREOF, DROPLET GENERATION DEVICE, AND MICROSPHERE PREPARATION DEVICE

The present application claims priority of Chinese application No. 201711416785.0, filed on Dec. 25, 2017. The disclosed content of the Chinese application is hereby entirely incorporated into the present disclosure.

FIELD OF THE DISCLOSURE

The disclosure relates to the technical field of microsphere preparation, in particular to a microfluidic chip and a control method thereof, a droplet generation device and a microsphere preparation device.

BACKGROUND OF THE DISCLOSURE

Microspheres have shown advantages in many applications, including building blocks for complex tissue simulation, co-culture systems for developing three-dimensional organ models, and tissue regeneration. The cell-loaded microgel is dropletized to form the microspheres, and then the microspheres are applied to 3D bioprinter to prepare tissues or three-dimensional organs after solidification culture, so the microspheres are important raw materials of the 3D bioprinter.

During the preparation of the microspheres, separate droplets need to be formed at first, there are many kinds of droplet preparation technologies, such as emulsification, mixing, embedding, extraction, microreaction, and the like. However, since the method of preparing the droplets by macroscopic techniques tends to be more intense and generates large damage to cells, it is not suitable for 3D biological printing, therefore the droplets in required sizes are generally prepared by using the microfluidic technology.

At present, cell-loaded microgel droplets are typically synthesized using the microfluidic technology. The microfluidic technology as a common method in liquid or gas control, is a technology for precise operation, processing and controlling of fluid or samples at several nanometer scales, and is generally for operating and controlling the sample fluids in microchannels with a range of 100 µm. The microfluidic technology is used for separating cell fluid on the basis of the flow channel of 100 µm and is applied to bioanalysis without restrictions or requirements on cell activity.

Microfluidic chip micro-droplet generation structures include active and passive types, wherein the active type uses the external force such as an electric field force, thermal energy and the like to generate an energy gradient locally to control the micro-droplets, mainly including electrowetting, dielectrophoresis, pneumatic method and thermal capillary method or the like, and the methods can be used for operating and controlling a single microdroplet. However, the active electrical, magnetic, acoustic, optical, thermal and the like generates adverse effects on the cells inevitably. Therefore, in order to improve the activity of the cells, the passive method is preferred in practical applications, that is, a microfluidic structure is designed to locally generate a velocity gradient to operate and control the micro-droplets, and the adverse effects generated by the electrical, magnetic, acoustic, optical, thermal and the like in the active microfluidic technology to the cells can be avoided.

The research on microfluidic chips in the prior art is generally directed to chips with flow channel sizes within 100 µm, such as 20 µm, 40 µm, 60 µm, 80 µm, but there is no specific research on how to ensure the activity of the solution mixture containing cells, how to improve the yield or the shearing method of high-viscosity raw materials and the like.

One bottleneck of 3D biological printing is that the production efficiency of the raw materials (such as the droplets formed by cell-loaded microgels) is low, and the work of one 3D bioprinter can be met only by multiple biological raw material preparation instruments, therefore it is necessary to improve the yield of the raw materials urgently. As the bioprinting raw materials can be applied to the 3D biological printing to generate micro-tissues, even construct three-dimensional organs, however, an important premise is that the cell activity in the biological raw materials needs to be maintained to be higher than 60%, if the activity is too low, the printed tissues or the three-dimensional organs cannot survive. The higher the cell activity in the biological raw materials, the higher the survival rate of the organs printed by the 3D biological printing. Therefore, it is a problem to be solvent urgently at present that the preparation yield of the biological raw materials is improved while ensuring the cell activity.

SUMMARY OF THE DISCLOSURE

Embodiments of the present disclosure provide a microfluidic chip and a control method thereof, a droplet generation device and a microsphere preparation device, which can improve the efficiency of forming droplets on the basis of ensuring the desired activity of cells in the sheared phase fluid.

In order to achieve the above object, a first aspect of the embodiments of the present disclosure provides a microfluidic chip, including a matrix, a first flow channel and a second flow channel provided in the matrix, the first flow channel and the second flow channel intersect to form an intersection area, sheared phase fluid can flow in from the first flow channel, shearing phase fluid can flow in from the second flow channel so as to separate the sheared phase fluid into discrete droplets in the intersection area, and the cross-sectional areas of the first flow channel and the second flow channel range from 0.1 mm$^2$ to 1 mm$^2$.

Further, the cross-section of a portion of the first flow channel located upstream of the intersection area is constant, or gradually increases along the flow direction of the sheared phase fluid.

Further, two second flow channels are respectively provided on two sides of the first flow channel to form a flow sandwiching focusing flow channel in the intersection area.

Further, the first flow channel and the two second flow channels form a cross structure in the intersection area.

Further, each of the second flow channels is of an L-shaped structure in the intersection area, the lateral portion of the L-shaped structure is communicated with a first flow channel and is vertical to the first flow channel, and a vertical portion of the L-shaped structure is parallel to the first flow channel.

Further, the distance between the vertical portion of the L-shaped structure and the first flow channel ranges from 0.1 mm to 20 mm.

Further, the two second flow channels are provided at an angle to the first flow channel, and an included angle between the second flow channels and the first flow channel is less than 90°.

Further, the two second flow channels are symmetrically provided with respect to the first flow channel.

Further, the cross sections of the first flow channel and the second flow channel are rectangular, circular or trapezoidal.

Further, the cross sections of the first flow channel and the second flow channel are rectangular, and the rectangular cross section has a length ranging from 0.7 mm to 2 mm, and/or a width ranging from 0.2 mm to 0.6 mm.

Further, the viscosity ratio of the sheared phase fluid to the shearing phase fluid ranges from 10:1 to 30:1.

Further, the viscosity of the sheared phase fluid is less than 3000 cp.

Further, the flow rate ratio of the sheared phase fluid to shearing phase fluid in each of the second flow channels in the intersection area ranges from 1:10 to 1:20.

Further, the flow rate of the shearing phase fluid in each of the second flow channels in the intersection area ranges from 100 μL/min to 400 μL/min, and the flow rate of the sheared phase fluid in the intersection area ranges from 10 μL/min to 40 μL/min.

Further, the droplet has a diameter ranging from 200 μm to 400 μm.

Further, the shearing phase fluid is injected into both ends of the two second flow channels through a common fluid inlet, or the shearing phase fluid is respectively injected into the both ends of the two second flow channels through independent fluid inlets.

Further, a plurality of microfluidic units are provided in the matrix, each microfluidic unit is provided with the flow sandwiching focusing flow channel, and the microfluidic units can work simultaneously or alternately.

Further, the sheared phase fluid includes core liquid, coating liquid or a curing agent, and the microfluidic chip is used for forming core liquid droplets, coating liquid droplets or curing agent droplets.

Further, the core liquid is a collagen solution containing cells, and the shearing phase fluid is an oily solvent.

In order to achieve the above object, a second aspect of the embodiments of the present disclosure provides a droplet generation device, including the microfluidic device in the above embodiments.

Further, the droplet generation device further includes a pumping device communicated with the first flow channel and the second flow channel, for controlling the flow rate of the sheared phase fluid entering the first flow channel, and controlling the flow rate of the shearing phase fluid entering the second flow channel.

Further, the droplet generation device further includes an input component communicated with the inlets of the first flow channel and the second flow channel for conveying the fluid for forming droplets to the first flow channel and the second flow channel; or the droplet generation device further includes an output component communicated with the outlets of the first flow channel and the second flow channel for outputting the formed droplets.

In order to achieve the above object, a third aspect of the embodiments of the present disclosure provides a microsphere preparation device, including the droplet generation device in the above embodiments.

In order to achieve the above object, a fourth aspect of the embodiments of the present disclosure provides a control method of the above microfluidic chip, wherein the flow rate ratio of the sheared phase fluid to shearing phase fluid in each of the second flow channels in the intersection area ranges from 1:10 to 1:20.

Further, the flow rate of the shearing phase fluid in each of the second flow channels in the intersection area ranges from 100 μL/min to 400 μL/min, and the flow rate of the sheared phase fluid in the intersection area ranges from 10 μL/min to 40 μL/min.

Based on the above technical solutions, according to the microfluidic chip in one embodiment of the present disclosure, by increasing the cross-sectional areas range of the first flow channel and the second flow channel to 0.1 mm$^2$~1 mm$^2$, the pass rate of the fluid can be increased, thereby the flow rate is increased, and then the efficiency of forming the droplets can be improved; moreover, the flow velocity of the fluid can also be reduced by increasing the sizes of the flow channels, so that the shear force caused by the friction between the cells flowing in the flow channels and the flow channel walls is reduced, thereby reducing the damage to the cells and ensuring the activity of the cells, and the sheared phase fluid is separated into discrete droplets by a sufficient shear force generated by adjusting the flow rate in the control process. Therefore, the microfluidic chip of the embodiments of the present disclosure can improve the efficiency of generating the droplets on the basis of ensuring the cell activity to meet the requirements of 3D biological printing.

BRIEF DESCRIPTION OF THE ACCOMPANYING DRAWINGS

The drawings described herein are intended to provide a further understanding of the present disclosure and constitute a part of the present application. The illustrative embodiments of the present disclosure and the descriptions thereof are used for explaining the present disclosure and do not constitute undue limitations to the present disclosure. In the drawings.

DETAILED DESCRIPTION OF THE PREFERRED EMBODIMENTS

Figure 1:
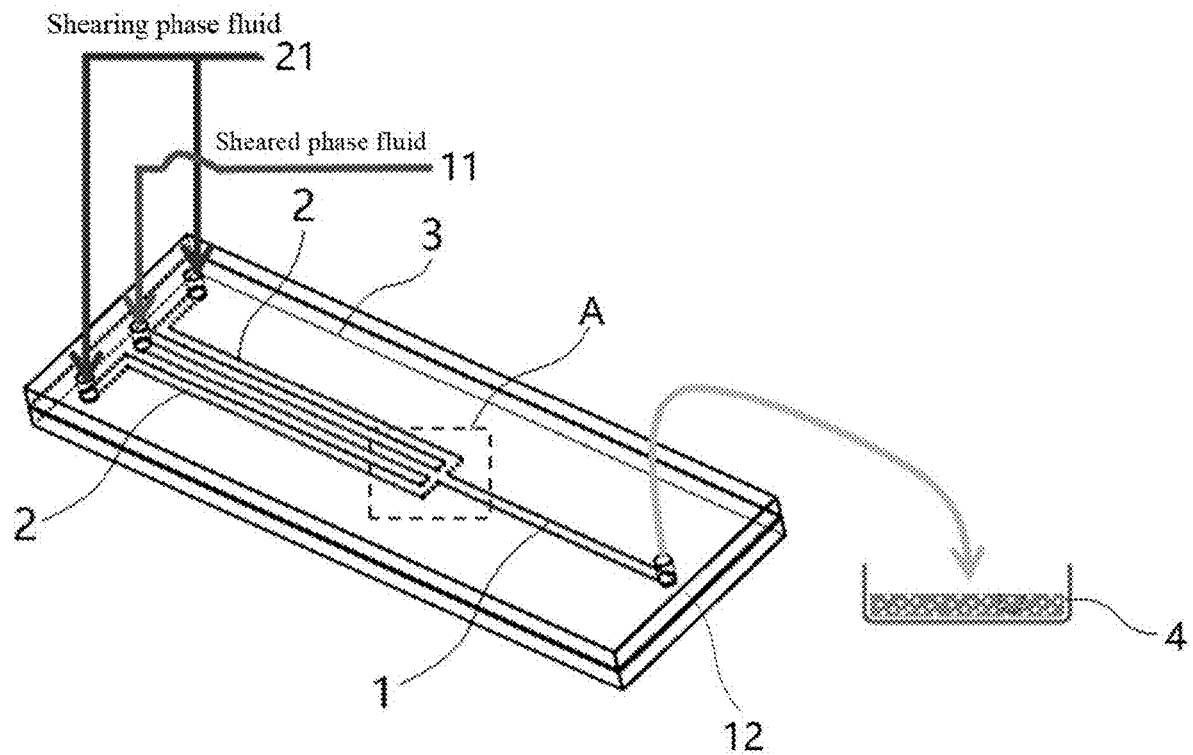
FIG. 1 is a structural schematic diagram of one embodiment of a microfluidic chip of the present disclosure.

The present disclosure is described in detail below. In the following paragraphs, different aspects of the embodiments are defined in more detail. Various aspects so defined can be combined with any other one or more aspects unless clearly indicated that they are not combinable. In particular, any feature that is considered to be preferred or advantageous can be combined with the other one or more features that are considered to be preferred or advantageous.

The terms "first", "second" and the like appearing in the present disclosure are merely for the convenience of description to distinguish different components having the same name, and do not indicate sequential or primary-secondary relationship.

In the description of the present disclosure, it should be understood that orientation or positional relationships indicated by orientation words such as "front, back, up, down, left, right", "lateral, vertical, perpendicular, horizontal" and "top, bottom" and the like are generally orientation or positional relationships shown based on the drawings, and are merely for the convenience of the description of the present disclosure and the simplified description, and these orientation words do not indicate or imply the indicated device or component must have specific orientations or constructed and operated in the specific orientations, and thus cannot be construed as limiting the protection scope of the present disclosure; and the orientations "inside and outside" refer to the inside and outside of the contour of the components themselves.

The microfluidic chip of the present disclosure refers to a microfluidic chip having a droplet generation function, which can be used for forming various droplets required for preparing microspheres, for example, forming core liquid droplets, coating liquid droplets or curing agent droplets.

Flow channels are provided in the microfluidic chip, and the principle of generating the droplets is to inject two kinds of mutually incompatible fluid into the flow channels of the microfluidic chip, wherein one kind of fluid is a dispersed phase and is used as sheared phase fluid, the other kind of fluid is a continuous phase and is used as shear fluid, and the dispersed phase fluid is separated into discrete droplets by the continuous phase fluid in an interaction area of the two kinds of fluid.

Specifically, after the continuous phase fluid and the dispersed phase fluid respectively enter the corresponding flow channels in the microfluidic chip, an interface of the continuous phase fluid and the dispersed phase fluid is formed at the intersection of different flow channels. The dispersed phase fluid synchronously moves forward with the continuous phase fluid under the propulsion of an external force and under the action of a shear force of the continuous phase fluid. When the interfacial tension at the interface is insufficient to maintain the shear force applied by the continuous phase fluid to the dispersed phase fluid, the dispersed phase fluid breaks to form separate micro volume units namely the droplets, which are surrounded by the continuous phase fluid.

For example, in the case that the continuous phase fluid is oil phase and the dispersed phase fluid is water phase, an oil/water interface is formed at the intersection of the oil and water phase, and the water phase synchronously moves forward with the oil phase under the propulsion of the external force and under the action of the shear force of the oil phase, when the interfacial tension at the oil/water interface is insufficient to maintain the shear force applied by the oil phase to the water phase, the water phase breaks to form separate droplets surrounded by the oil phase.

As mentioned in the background art, the efficiency of the general microfluidic chip in the prior art to generate the droplets is relatively low, and it is difficult to meet the high-efficiency working requirements of the 3D bio-printer. Therefore, it is necessary to improve the efficiency of the microfluidic chip to generate the droplets so as to generate more microspheres to meet the requirements of 3D biological printing.

In order to solve this problem, the inventors have noticed a cross flow channel structure is used in the prior art, the first flow channel is used for injecting the sheared phase fluid, for example, a cell-containing solution, and the second flow channel is used for injecting the shearing phase fluid, a nozzle is provided at a upstream position of the intersection area of the first flow channel, the main purpose is to increase the flow velocity of the sheared phase solution and increase the shear force, so that the cell solution can be sheared more easily, therefore, the droplet generation efficiency is appropriately improved.

However, in the actual biological 3D printing process, the microfluidic chip has a limited improvement in droplet yield, it is still difficult to meet the requirements of the biological 3D printing, and it is found that cells in the droplet may also have different degrees of damage, so that it is difficult to meet the requirements for the cell activity in the 3D printing.

To this end, the inventors studied the restriction relationship of various parameters in the droplet generation process by the above-mentioned microfluidic chip provided with the nozzle.

The advantage of the nozzle in the existing solution is to increase the flow rate of the dispersed phase, and it has been found through experiments that if the flow velocity of the shear phase and the sheared phase is further increased, the droplet generation frequency can be improved, but a direct problem caused by the increased flow velocity is that the shear force is greatly increased. Experiments have shown that red blood cells can only withstand a shear force of about 150 Pa within 100 s. Therefore, the existing microfluidic chips cannot increase the yield of the droplets from the viewpoint of protecting the cell activity. Moreover, since the nozzle has a tapered outlet with a shrinking structure, when the cells flow out from the tapered outlet, the cells are easily impacted on the wall surface of the tapered outlet, which also causes damage to the cells, resulting in a decrease in the cell activity.

From the perspective of ensuring the cell activity in the droplets, an optional measure is to directly cancel the nozzle on the basis of the existing microfluidic chip with a flow channel size (below 100 μm), then the flow velocity of the sheared phase is reduced, and correspondingly, the shear force is also reduced. However, since the viscosity of the sheared phase is usually large, the difficulty of dispersing the sheared phase into the droplets is increased, resulting in a slower speed of generating the droplets. Moreover, the generation efficiency of the droplets is also reduced by the reduction of the flow velocity of the sheared phase.

On this basis, in order to improve the efficiency of generating the droplets, it is necessary to increase the flow velocity of the shear phase and the sheared phase, on one hand, more sheared phase fluid can be consumed within a unit time, on the other hand, a greater shear force can be provided due to the increase of the velocity of the shear phase, the difficulty of forming the droplets is reduced, and both of these factors are beneficial to improving the efficiency of generating the droplets.

However, as the velocity of the two-phase fluid increases, the sheared phase fluid generates relatively friction with the inner wall of the flow channel while flowing in the flow channel, thus increasing the shear force on the cells, and when the cell-containing solution flows in the flow channel, the activity of the cells is greatly weakened by the great increase of the shear force.

If the nozzle is directly canceled on the basis of the existing small flow channel, the flow velocity is lowered, the shear force is lowered, and as the viscosity is relatively large, the dispersion difficulty is increased, the speed of generating the microspheres is slowed, and the yield is also reduced by the reduced flow velocity of the dispersed phase. Although the yield can be improved by increasing the speed of the sheared phase, the sheared phase generates friction with the wall of the flow channel while flowing in the flow channel to generate the shear force, and the activity of the cells is greatly weakened by the great increase of the shear force in the flow process. Therefore, the idea of directly canceling the nozzle still cannot satisfy the requirement of increasing of the droplet yield on the basis of ensuring the cell activity.

So the inventors further considered the manner of increasing the size of the flow channel, considering that the current flow channel size commonly used in the microfluidic chip is within 0.5 mm×0.1 mm, the research on the microfluidic technology is also based on the size range, and the change of the size of the flow channel in the microfluidic chip can produce mutual coupling with other control parameters, thereby affecting the yield of generating the droplets and the cell activity. In this way, in the field of cell-containing droplet generation technology, it is difficult to consider the method of improving the yield of the droplets while ensuring the cell activity by increasing the sectional area of the flow channel without the guidance and inspiration of the prior art.

Based on the above analysis, when the droplets are formed by using the microfluidic technology, the size of the flow channel has direct influence on the yield and the cell activity of the droplets. Therefore, in order to meet the requirements of the 3D biological printing, it is necessary to select a suitable size of the flow channel according to the yield and the cell activity of the droplets, and the mutually coupled parameters match each other by selecting a proper flow velocity in combination with the viscosity of the fluid, in order to finally meet the requirements of the yield and the cell activity of the droplets. This is fundamentally different from the principle of implementing liquid separation by using the microfluidic technology. In a liquid separation chip, a series of bifurcated flow channels are provided to split the liquid, and the cross-sectional area of each flow channel can be directly designed based on the distributed flow rate. Therefore, due to the different objects of the microfluidic control, when the droplets are formed by using the microfluidic technology, reference cannot be made to the sizes of the flow channels of the of the liquid separation chip.

Therefore, the inventors made theoretical analysis after proposing such an improvement idea. After the size of the flow channel is increased, more fluid can be allowed to pass through the same section, thus increasing the flow rate of fluid passing through within the unit time. The consumption of raw materials (such as a cell solution) can be increased by the sheared phase fluid due to the increase of the flow rate, the shearing phase fluid can increase the shear force provided for the cell solution due to the increase of the flow rate, and both of the influencing factors can improve the efficiency of the microfluidic chip to generate the droplets.

Moreover, if the size of the flow channel is increased, it is advantageous to adjusting the flow velocity of the shear phase and the sheared phase, which is particularly advantageous to reducing the flow velocity of the two phases, wherein after the flow velocity of the sheared phase is reduced, the shear force caused by the friction between the cells and the inner wall of the flow channel is also correspondingly reduced in a flow process in the flow channel, which is advantageous to ensuring the activity of the cells before being sheared in the intersection area; and after the flow velocity of the shear phase is reduced, the shear force applied by the shearing phase fluid in the interaction area of different flow channels to the flow velocity of the sheared phase fluid can be properly reduced, and the damage to the cell-containing raw material is reduced as much as possible when the sheared phase fluid is separated to droplets of predetermined sizes.

Although the flow velocity of the shearing phase fluid is reduced and the shear force provided for the sheared phase fluid is correspondingly reduced, since the flow rate of the shearing phase fluid passing through the interaction area increases within the unit time, there is still sufficient shear force to separate the sheared phase fluid. If the viscosity of the sheared phase is relatively large and a greater shear force is required, the flow velocity of the two phases can also be fine tuned, so that the shearing phase fluid still has a sufficient shear force to disperse the cell solution into the droplets. Through analysis, the idea of increasing the size of the flow channel of the microfluidic chip can improve the efficiency of generating the droplets on the basis of ensuring the cell activity.

At present, for the microfluidic chip of the large flow channel, in order to improve the efficiency of generating the droplets and ensure the cell activity, how to design the size of the flow channel, how to control the flow velocity of the two phases, and how to select the viscosity and the materials of the two phases still lack related researches in the microfluidic technology.

The present disclosure improves the microfluidic chip of the prior art according to this idea. In an exemplary embodiment, combined with FIGS. 1 to 3, the microfluidic chip includes a matrix 3, a first flow channel 1 and a second flow channel 2, which are provided in the matrix 3, the first flow channel 1 and the second flow channel 2 communicate with each other, and the first flow channel 1 and the second flow channel 2 intersect to form an interaction area. The sheared phase fluid can flow in from the first flow channel 1, and the shearing phase fluid can flow in from the second flow channel 2 to separate the sheared phase fluid into discrete droplets in the intersection area, and the cross-sectional areas of the first flow channel 1 and the second flow channel 2 range from 0.1 $mm^2$ to 1 $mm^2$. Preferably, the cross-sectional area can be selected from 0.1 $mm^2$, 0.2 $mm^2$, 0.3 $mm^2$, 0.4 $mm^2$, 0.5 $mm^2$, 0.6 $mm^2$, 0.7 $mm^2$, 0.8 $mm^2$, 0.9 $mm^2$, 1 $mm^2$ or the like.

One or more second flow channel 2 communicated with the specific first flow channel 1 can be provided, and each segment of independent portion of a side of the first flow channel 1 used for the inflow of the shearing phase fluid can be defined as a second flow channel 2.

Figure 2:
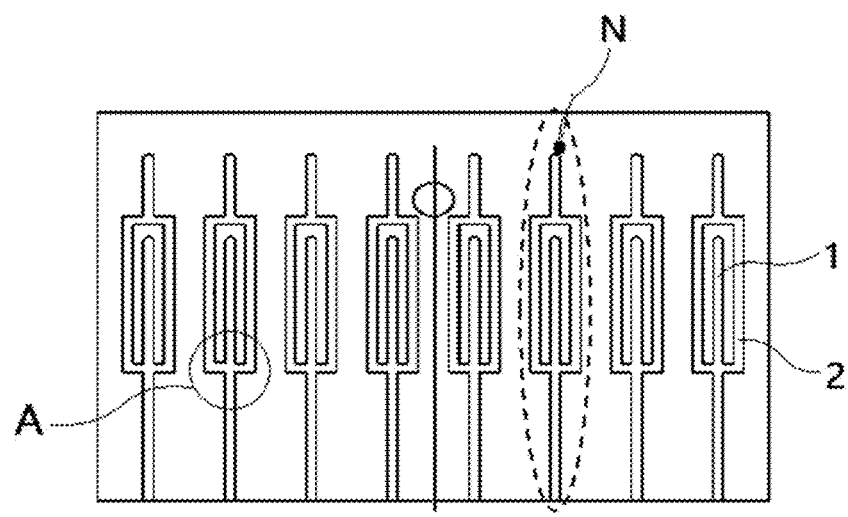
FIG. 2 is a structural schematic diagram of another embodiment of a microfluidic chip of the present disclosure.

Preferably, as shown in FIGS. 1 and 2, the first flow channel 1 and the second flow channel 2 have rectangular cross sections. The flow channel with the rectangular cross section has the following advantages:

(1) the flow channel can be conveniently processed in the matrix 3, the size is easy to ensure, and the manufacturing difficulty of the microfluidic chip can be reduced;

(2) the size of the flow channel is easy to ensure, various parameters of the microfluidic can be more accurately ensured, for example, the flow velocity of the fluid at the intersection area is accurately controlled;

(3) the resistance of fluid flowing in the flow channel is relatively small, which is advantageous to maintaining the pressure to keep the required flow velocity at the intersection area;

(4) in order to weaken the adhesion of the inner surface of the flow channel to the droplets and to reduce the flow resistance, preferably, a hydrophobic material is coated on the inner surface of the flow channel, so that the droplets can flow out from the flow channel more easily, and it is more convenient to coat the hydrophobic material on the flow channel with the rectangular cross section, and it is also easy to ensure coated thickness of the material; and (5) it is advantageous to making the microfluidic chip in which the flow channels are stacked in the height direction.

Optionally, according to use requirements, the cross sections of the first flow channel 1 and the second flow channel 2 can also be designed to circles, trapezoids, or other shapes which are advantageous to the flow of the fluid but generate no damage to the cells in the sheared phase fluid.

According to the above analysis, the microfluidic chip of the embodiment of the disclosure can improve the efficiency of generating the droplets on the basis of ensuring the cell activity by increasing the size of the flow channel. After the size of the flow channel is increased, the schemes in which first flow channel 1 is provided with a nozzle at a position upstream of the intersection area and the nozzle is not provided are within the protection scope of the present disclosure.

Figure 3:
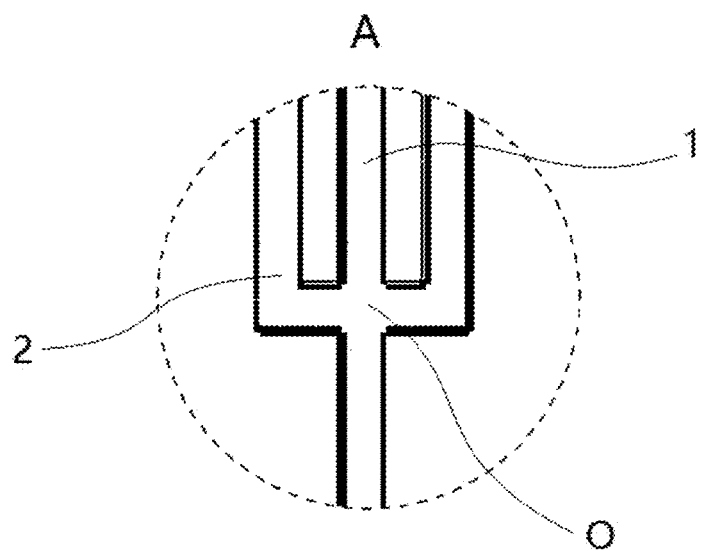
FIG. 3 is an enlarged drawing at A in FIG. 1 and FIG. 2.

Since the nozzle has a tapered outlet with a shrinking structure, when the cells flow out from the tapered outlet, the cells easily impacted on the wall surface of the tapered outlet, which also causes damage to the cells, resulting in a decrease in the cell activity. In order to further improve the cell activity, in another embodiment of the present disclosure, as shown in an enlarged drawing as shown in FIG. 3, the nozzle of the first flow channel 1 located upstream of the intersection area is canceled, so that the size of the portion of the first flow channel 1 located upstream of the intersection area and used for conveying the fluid keeps consistent. Alternatively, the size of the first flow channel 1 located upstream of the intersection area gradually increased along the flow direction of the sheared phase fluid, as long as the size of the first flow channel 1 located upstream of the intersection area is not of a shrinking structure, both of which are within the protection scope of the present disclosure.

The advantages of the embodiment are that, the damage to the cells can be reduced when the sheared phase fluid flows in the first flow channel 1, so as to ensure the activity of the cells while improving the yield of the droplets. Although the flow velocity of the shearing phase fluid is reduced and the shear force provided for the sheared phase fluid is reduced after the nozzle is canceled, there is still sufficient shear force to separate the sheared phase fluid after the flow velocity of the shearing phase fluid is reduced. If the viscosity of the sheared phase is relatively large and a greater shear force is required, the flow velocity of the two phases can also be fine tuned, so that the shearing phase fluid still has a sufficient shear force to disperse the cell solution into the droplets.

The structural form specifically applicable to the microfluidic chip of the present disclosure is given below. Optionally, the microfluidic chip can employ a flow sandwiching focusing channel or a T-shaped channel. The flow sandwiching focusing channel or the T-shaped channel is advantageous to adjusting the size and the generation rate of the droplets, and is also advantageous to reducing the damage to active substances in the droplets in the droplet generation process.

In one type of embodiment, two second flow channels 2 are respectively provided on the two sides of the first flow channel 1, and the shearing phase fluid can be respectively injected into the two second flow channels 2 to form the flow sandwiching focusing channel in the interaction area. The sheared phase fluid can be injected from one end of the first flow channel 1, the shearing phase fluid is respectively injected from the two second flow channels 2, a certain shear force can be provided for the sheared phase fluid via the flow velocity of the shearing phase fluid, and meanwhile the sheared phase fluid is separated into discrete droplets by the instability of the fluid. The flow sandwiching focusing channel can not only produces microdroplets with better monodisperse and better control the sizes of the droplets, but also has a shear force smaller than that of the T-channel, which is beneficial to maintain the cell activity.

Preferably, as shown in FIG. 3, the first flow channel 1 and the two second flow channels 2 form a cross structure in the intersection area, that is, an included angle between the first flow channel 1 and the two second flow channels 2 is 90°.

Figure 4:
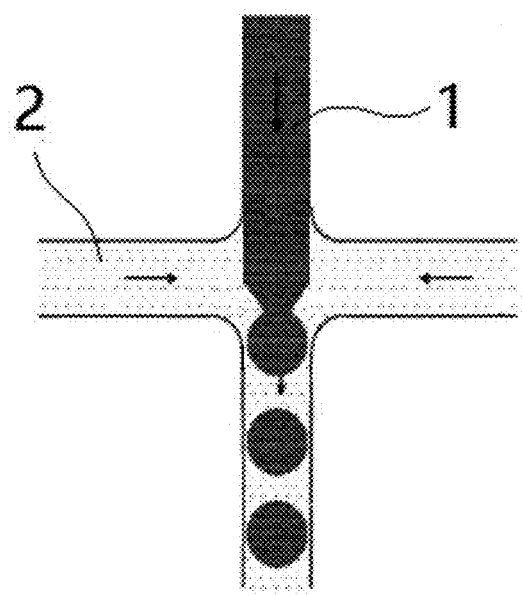
FIG. 4 is a schematic diagram of forming droplets via a cross structure flow channel.

Referring to FIG. 4, the working principle of the cross flow channel microfluidic chip is described in the orientation as shown in FIG. 4. The sheared phase fluid flows in from the upper end of the first flow channel 1 along the arrow direction, the shearing phase fluid respectively flows in from the second flow channels 2 on the two sides of the first flow channel 1 along the arrow direction, in the interaction area of the first flow channel 1 and the two second flow channels 2, the shearing phase fluid generates a flow sandwiching focusing effect on the sheared phase fluid, and the sheared phase fluid is separated into the discrete droplets by the symmetric shearing force of the shearing phase fluid on the two sides.

Preferably, as shown in FIG. 4, the two second flow channels 2 are of L-shaped structures in the intersection area, a lateral portion of the L-shaped structure is communicated with the first flow channel 1 and is perpendicular to the first flow channel 1, and a vertical portion of the L-shaped structure is parallel to the first flow channel 1, and the extension direction of the vertical portion can be consistent with the direction of injecting the sheared phase fluid into the first flow channel 1.

By setting the second flow channel 2 as the L-shaped structure, as shown in FIG. 2, the width of a each microfluidic unit N in the microfluidic chip can be reduced, which is advantageous to setting more microfluidic units N along the width direction of the microfluidic cell N at intervals in the case that the area of the matrix 3 is constant, so as to improve the yield of the droplets. In addition, it is easier to ensure the yield required for each kind of droplets when different kinds of droplets need to be prepared.

Preferably, the distance between the vertical portion of the L-shaped structure and the first flow channel 1 ranges from 0.1 mm to 20 mm, and the distance is calculated based on the center lines of the two flow channels. For example, the distance between the vertical portion of the L-shaped structure and the first flow channel 1 can be 0.1 mm, 0.5 mm, 1 mm, 3 mm, 5 mm, 8 mm, 10 mm, 12 mm, 15 mm, 18 mm, 20 mm or the like.

When the shearing phase fluid flowing in from the L-shaped vertical portion passes through a bend, the flow direction and the flow velocity of the fluid unit are greatly different, if the distance between the vertical portion of the L-shaped structure and the first flow channel 1 is too small, the shearing phase fluid entering the lateral portion of the L-shaped structure from the bend has started to shearing the sheared phase fluid without flowing stable flow velocity and flow direction, the unstable shear force is likely to cause cell damage, and the sizes of the finally formed droplets cannot be ensured. If the distance between the vertical portion of the L-shaped structure and the first flow channel 1 is too large, after the sheared phase fluid enters the lateral portion of the L-shaped structure, the flow velocity is easily attenuated due to the resistance of the inner wall of the second channel 2, which ultimately affects the shear force provided for the sheared phase fluid.

Therefore, in the embodiment, by selecting the distance between the vertical portion of the L-shaped structure and the first flow channel 1 within the above range, the sheared phase fluid can form a stable flow state while flowing in the lateral portion of the L-shaped structure, in order to provide a stable shear force for the sheared phase fluid in the intersection area, which is advantageous to ensuring the cell activity, and is also advantageous to improving the uniformity and controllability of the sizes of the droplets. Moreover, the attenuation of the flow velocity when the shearing phase fluid flows in the lateral portion of the L-shaped structure can also be reduced to provide a sufficient shear force for the sheared phase fluid.

In addition to the cross flow channels, in other embodiments, the two second flow channels 2 can also be provided at an angle to the first flow channel 1, and an included angle between the second flow channels 2 and the first flow channel 1 is less than 90°. Preferably, the two second flow channels 2 have the same inclination direction and both incline upward or both incline downward.

More preferably, the two second flow channels 2 are provided symmetrically with respect to the first flow channel 1. The symmetrical arrangement includes that the inclination angles of the two second flow channels 2 with respect to the first flow channel 1 are the same, further, the lengths of the two second flow channels 2 are also the same. Due to the symmetrical arrangement of inclination angles, the shear forces provided by the shearing phase fluid on the two sides are consistent, which is conducive to ensuring the uniformity of the sizes of the droplets and the activity of the droplets; and due to the symmetrical arrangement of lengths, in the case that the injection speeds of the shearing phase fluid on the two sides are consistent, the shearing phase fluid still keeps a consistent speed while arriving at the interaction area, so that the shear forces provided by the shearing phase fluid on the two sides are consistent.

In another alternative embodiment, the microfluidic chip employs a T-shaped flow channel. The T-shaped flow channel includes a third flow channel and a fourth flow channel that intersects with the third flow channel. The third flow channel is used for injecting the shearing phase fluid, the fourth flow channel is used for injecting the sheared phase fluid, and the sheared phase fluid is sheared by the shearing phase fluid at the intersection of the third flow channel and the fourth flow channel into droplets.

Figure 5:
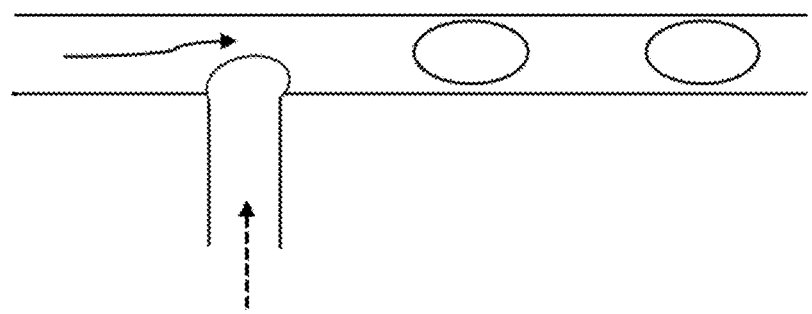
FIG. 5 is a schematic diagram of forming droplets via a T-shaped flow channel.

Referring to FIG. 5, a solid arrow in FIG. 5 represents the shearing phase fluid, and a dashed arrow represents the sheared phase fluid. The working principle of the microfluidic chip having the T-shaped flow channel to generate the droplets is as follows: the shearing phase fluid flows in from a horizontal flow channel (corresponding to the third flow channel) in FIG. 5 respectively, and the sheared phase fluid flows in from a vertical flow channel (corresponding to the fourth flow channel). At the interface of the two phases (corresponding to the intersection of the third flow channel and the fourth flow channel), the sheared phase fluid is subjected to the shear force of the shearing phase fluid, and when the interfacial tension at the interface of the two phases is insufficient to resist the shear force applied by the shearing phase fluid to the sheared phase fluid, the sheared phase fluid is broken to generate independent micro volume units, namely droplets, which are surrounded by the sheared phase fluid.

On the basis of the above microfluidic chip, the inner surfaces of the first flow channel 1 and the second flow channel 2 are hydrophobic surfaces, which are hydrophobic and can be realized by coating a hydrophobic material. Preferably, the inner surfaces of the first flow channel 1 and the second flow channel 2 are superhydrophobic surfaces. The arrangement can reduce the adhesion of the inner surface of the flow channel to the droplets and reduce the flow resistance when the aqueous droplets are generated.

Preferably, the microfluidic chip can be fabricated by using polydimethylsiloxane (PDMS), and a hydrophobic treatment is performed on the inner surface of the flow channel of the droplet microfluidic chip, so that the inner surface of the flow channel of the droplet microfluidic chip exhibits hydrophobicity. The droplet microfluidic chip can also be fabricated by using glass or polymethyl methacrylate (PMMA), and the hydrophobic treatment is performed on the inner surface of the flow channel, so that the inner surface of the flow channel of the droplet microfluidic chip exhibits hydrophobicity. For example, the method of performing the hydrophobic treatment on the inner surface of the flow channel is to perform a surface treatment by using octadecyltrichlorosilane (OTS).

Since the cross-sectional sizes of the first flow channel 1 and the second flow channel 2 have important influence on the yield and activity of the droplets, the influence of the selection of the size of the flow channel on the cell activity and yield of the droplets is illustrated by using the microfluidic flow channel having a rectangular cross section as an example.

Preferably, the first flow channel 1 and the second flow channel 2 have rectangular cross sections, the rectangular cross section has a length ranging from 0.7 mm to 2 mm, and/or a width ranging from 0.2 mm to 0.6 mm. One or two of the length range and the width range of the rectangular cross section can be met.

Preferably, the length of the rectangular cross section is 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2 mm or the like; and the width of the rectangular cross section is 0.2 mm, 0.25 mm, 0.3 mm, 0.35 mm, 0.4 mm, 0.45 mm, 0.5 mm, 0.55 mm, 0.6 mm or the like.

For the cross passive microfluidic chip in the prior art, although the droplet generation yield can be improved by improving the flow velocity, the flow velocity is an important factor for limiting the sizes of the droplets, and the shear force is increased due to the increases of the flow velocity, although the yield is increased, the cell activity requirements cannot be met. The microfluidic chip of the present disclosure increases the size of the flow channel relative to the prior art, including individually increasing the length of the rectangular cross section, individually increasing the width, or simultaneously increasing the length and width. The following several forms are analyzed respectively.

If the length of the cross section of the flow channel is increased alone to form a very flat flow channel, the yield of the microfluidic chip can be increased due to the increase of the cross-sectional area of the flow channel. However, in the case of constant flow velocity, as the cross section of the flow channel is very flat, the shear force applied to the sheared phase is very large during the flow, which may cause damage to the cells, if the shear force is to be reduced, the flow rate needs to be reduced, such that the yield is reduced.

Therefore, there is a mutually restrictive relationship between the yield and the cell activity of the droplets.

In a working process of the microfluidic chip, the flow velocity of the two phases can be appropriately reduced, on the basis of reducing the shear force to meet the basic biological activity, and the reduced flow velocity can be compensated by increasing the cross-sectional area of the flow channel to ensure the increase of the yield of the droplets, which requires that the yield increase caused by the increase of the cross-sectional area of the flow channel is greater than the negative effect of the decrease of the flow velocity on the yield.

If the width of the cross section of the flow channel is increased alone, the very flat flow channel is also formed, which similar to the situation in which the width of the cross section of the flow channel is increased alone.

If the length and the width of the cross section of the flow channel are simultaneously increased, for example, the length of the cross flow channel is increased to 1 mm and the width is increased to 0.2 mm, the flow rate passing through the cross section of the flow channel within the unit time is increased due to the overall increase of the size of the cross section of the flow channel, and the yield of the droplets can be greatly improved. It has been experimentally found that the cell activity is improved compared with that in the prior art in the case that the yield is increased by a predetermined value. For example, the size of the rectangular flow channel can be designed to be 1.5 mm×0.2 mm, 1 mm×0.2 mm, 1 mm×0.3 mm, 0.75 mm×0.3 mm, 0.75 mm×0.5 mm or the like.

Preferably, the diameter sizes of the droplets generated by the microfluidic device of the present disclosure range from 200 μm to 400 μm. In practical operation, the sizes of the droplets can be controlled by a change in the sample injection flow velocity ratio of the shearing phase fluid to the sheared phase fluid. The greater the flow velocity of the sheared phase fluid is, the greater the sizes of the generated droplets are. The greater the flow velocity of the shearing phase fluid is, the smaller the sizes of the generated droplets are. Thus, the microfluidic chip has the characteristics of simple operation and high repeatability when controlling the sizes of the droplets.

Figure 9:
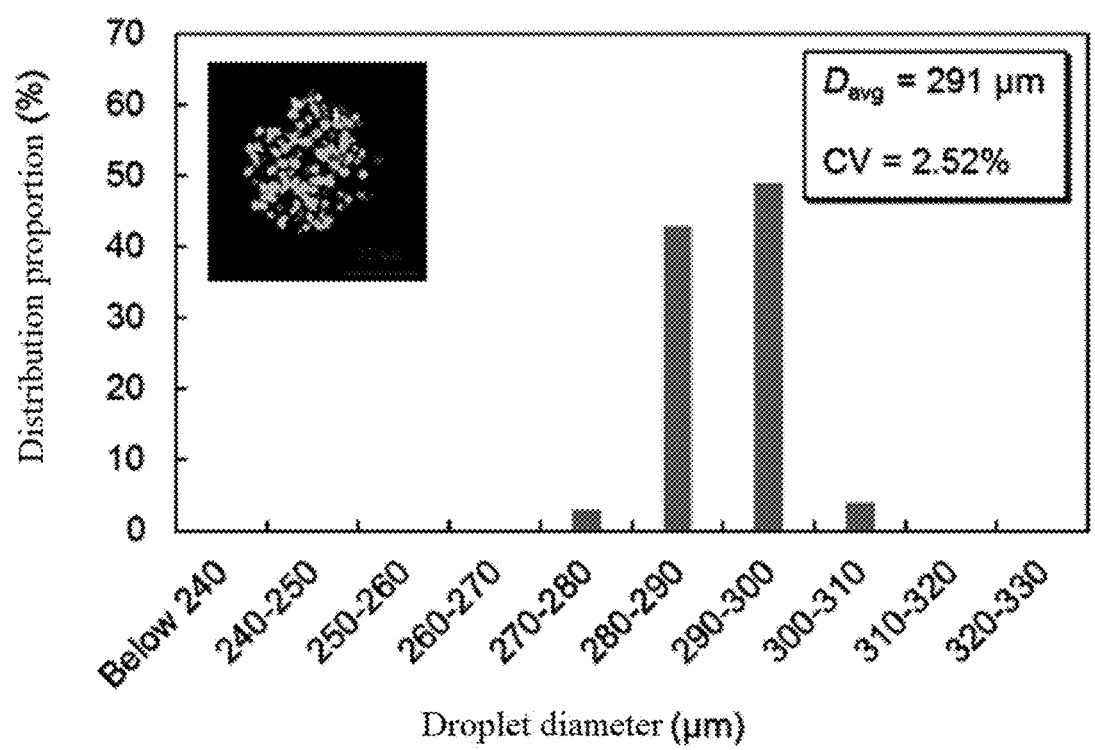
FIG. 9 is a schematic diagram of size distribution of droplets obtained by a microfluidic chip of the present disclosure.

In a specific embodiment, a microfluidic chip have a flow channel size of 0.75 mm×0.3 mm, under the condition that the viscosity of a dispersed phase is 1200 cp, the flow rate of the dispersed phase is 15 μL/min, and the flow rate of a continuous phase is 150 μL/min, cell droplets with an average size of 300 μm can be obtained. In the droplet diameter distribution diagram as shown in FIG. 9, the cell droplets with droplet diameter distribution of 280 μm to 290 μm account for 40% of the total amount, the cell droplets with droplet diameter distribution of 290 μm to 300 μm account for 50% of the total amount, and the average value of the diameters of the cell droplets is 291 μm.

The raw materials used in 3D biological printing are generally microspheres, and cell-loaded microgel is the main raw material of the microspheres, and the cell-loaded microgel isdropletized to form the microspheres. The cell-loaded microgel is used as the sheared phase, the viscosity of the sheared phase is usually high, microdroplets are generated by the interaction of the shear force, the adhesive force and the surface tension in a liquid flow bracket, therefore in the case that the viscosity of the sheared phase fluid is much higher than that of the shearing phase fluid, a greater shear force needs to be applied to shear the raw material solution into the droplets of predetermined sizes, which causes damage to the raw material solution containing the cells.

The present disclosure can meet the demand for the shear force for shearing the raw material solution with high viscosity by improving the size of the flow channel and controlling the flow velocity of the two phases, moreover, the droplets with uniform dispersion are formed, meanwhile the cell activity can be maintained, and the problem of microfluidic shearing difficulty of the raw material solution with high viscosity can be solved.

The microfluidic chip of the embodiment of the present disclosure can be applied to the following situation, in which the viscosity ratio of the sheared phase fluid to the shearing phase fluid ranges from 10:1 to 30:1, for example, 10:1, 12:1, 14:1, 15:1, 17:1, 18:1, 20:1, 22:1, 24:1, 26:1, 28:1 and 30:1.

Preferably, the viscosity of the sheared phase fluid ranges from 500 cp to 3000 cp, for example, 500 cp, 700 cp, 1000 cp, 1200 cp, 1500 cp, 1800 cp, 2000 cp, 2200 cp, 2400 cp, 2600 cp, 2800 cp and 3000 cp. Being more suitable for the situation in which the viscosity of the sheared phase fluid is 2000 cp, the viscosity of the shear phase is smaller, is generally not more than 100 cp.

In various embodiments of the present disclosure, the shear force is less than 100 Pa when the droplets are formed in the intersection area of the first flow channel 1 and the second flow channel 2. The shear force is related to the shear rate and the viscosity, the greater the flow velocity of the shearing phase fluid is, the greater the shear force can be provided, the greater the viscosity of the sheared phase fluid is, and the greater the required shear force is.

The sheared phase fluid in the above embodiment can include core liquid, coating liquid or a curing agent and the like, and the continuous phase fluid is incompatible with the dispersed phase fluid serving as the sheared phase, and can be liquid or a gas. The droplets of different materials can be generated by using the same continuous phase fluid or different dispersed phase fluids. Correspondingly, the microfluidic chip is used for generating core liquid droplets, coating liquid droplets or curing agent droplets.

The raw material of forming the droplets can be cell-loaded microgel and can also be any cell-containing solution, for example, the raw material can be naturally exiting, synthetic, sufficiently produced, modified, or any combination thereof. The naturally existing raw material can be from naturally existing biodegradable materials of animals and plants, such as collagen, fibrin, chitosan, alginate, starch, hyaluronic acid, laminin, agarose, gelatin, dextran and any combination thereof.

Preferably, the core liquid is a collagen solution containing cells, for example, a collagen mixture solution. In a specific embodiment, bovine type I collagen and adipose derived mesenchymal stem cells (ADSCs) can be mixed as a core material of the cell-loaded microgel.

Preferably, the shearing phase fluid is an oily solution having a certain biocompatibility such as mineral oil, edible oil, corn oil or peanut oil. Alternatively, the shearing phase fluid can also be air.

Figure 8:
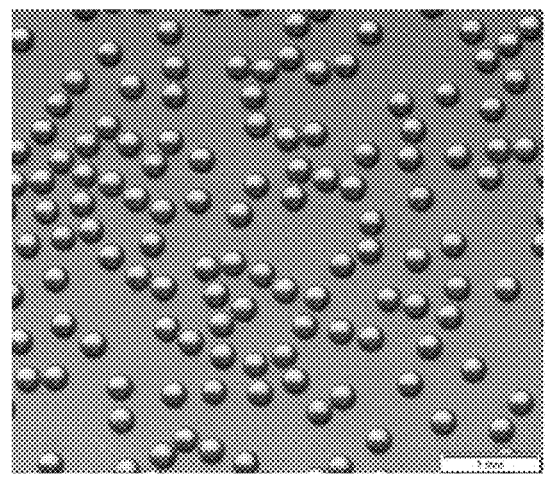
FIG. 8 is a schematic diagram of discrete droplets under a microscope obtained by a microfluidic chip of the present disclosure.

For example, the cell-collagen mixture and the mineral oil are separately injected into the first flow channel 1 and the second flow channel 2 of the chip by a pressure pump, and the droplets are formed because the collagen-cell mixture is squeezed by two streams of mineral oil. In a microphotograph of the microfluidic chip at the interaction area as shown in FIG. 8, the collagen mixture solution can be used for passively and rapidly generating collagen droplets dispersed in the oil solution. Further, the generated droplets can be collected by an outlet tube for gelation.

Specific embodiments that can be employed by the microfluidic chip of the present disclosure are given below. As shown in FIG. 1, the matrix 3 includes two layers of plates, and the flow channels are formed between the two layers of plates. The first flow channel 1 is a straight flow channel, which is provided with a first fluid inlet 11 and a droplet outlet 12, and the two second flow channels 2 are symmetrically provided on the two sides of the first flow channel 1, one respective ends of the two second flow channels 2 are respectively provided with independent second fluid inlets 21, the other respective ends of the two second flow channels communicate with the first flow channel 1 and form a cross structure in the intersection area.

When the droplets need to be generated, the dispersed phase fluid is injected into the first flow channel 1 from the first fluid inlet 11, the continuous phase fluid is respectively injected into the respective corresponding second flow channels 2 from the two second fluid inlets 21, the continuous phase fluid on the two sides shears the dispersed phase fluid into discrete droplets in the intersection area, and the droplets flow from the interaction area along the downstream of the first flow channel 1 and finally flow out from the droplet outlet 12, and the outflow droplets can be collected in a container 4.

In another embodiment, as shown in FIG. 2, a plurality of microfluidic units N are provided in the matrix 3, for example, 8 independent microfluidic units N, each microfluidic unit N is provided with the flow sandwiching focusing flow channel, for example, the cross structure, and the microfluidic units N can work simultaneously or alternately. Preferably, the plurality of microfluidic units N can be provided on the same direction, further the microfluidic units N can also be provided at equal intervals.

Such microfluidic chip can generate the droplets simultaneously or alternately to increase the efficiency, or can also generate different types of droplets by introducing different raw materials into different microfluidic units N, for example, a part of microfluidic units N is used for generating the core liquid droplets, a part of microfluidic units N is used for generating the coating liquid droplets, or a part of microfluidic units N is used for generating the curing agent droplets.

For each microfluidic unit N, the first flow channel 1 and the second flow channel 2 communicate with each other, and the cross structure is formed in the intersection area. The first flow channel 1 has a flat structure, the second flow channel 2 includes a rectangular flow channel, the first flow channel 1 is provided in the area surrounded by the rectangular flow channel, the first end portion of the first flow channel 1 intersects with one short margin of the rectangular flow channel and extends outward to form a flow channel for discharging the droplets, and the second end portion is spaced apart from the other short margin of the rectangular flow channel for injecting the dispersed phase fluid from the second end portion. An extension flow channel is provided on the short margin of the rectangular flow channel away from the interaction area for injecting the continuous phase fluid into the rectangular flow channel, that is, the shearing phase fluid is injected into the both ends of the two second flow channels 2 through a common fluid inlet.

The yield and the cell activity of the droplets obtained by the microfluidic chip are the result of the combination of various parameters, such as the flow channel shape, the flow channel size, the fluid viscosity, and the flow velocity of the shearing phase fluid and the sheared phase fluid. When the droplets are formed through a specific microfluidic chip by using a certain raw material, the performance in terms of the yield and the cell activity mainly depends on the flow velocity control of the two phases.

Thus the present disclosure further provides a control method of the microfluidic chip based on the above embodiment. The flow velocity of the two phases can be reflected by flow rate parameters. In a preferred embodiment, the flow rate ratio of the sheared phase fluid to shearing phase fluid in each of the second flow channels 2 in the interaction area ranges from 1:10 to 1:20. For example, 1:10, 1:11, 1:12, 1:13, 1:14, 1:15, 1:16, 1:17, 1:18, 1:19 and 1:20.

More preferably, the flow rate of the shearing phase fluid in each of the second flow channels 2 in the interaction area ranges from 100 µL/min to 400 µL/min, for example, 100 µL/min, 150 µL/min, 200 µL/min, 250 µL/min, 300 µL/min, 350 µL/min and 400 µL/min. The flow rate of the sheared phase fluid in the interaction area ranges from 10 µL/min to 40 µL/min, for example, 10 µL/min, 15 µL/min, 20 µL/min, 25 µL/min, 30 µL/min, 35 µL/min and 40 µL/min.

For example, for the flow channel of the cross structure, the flow rate of the shearing phase fluid injected from the second flow channels 2 on the two sides of the first flow channel 1 can range from 100 µL/min to 400 µL/min, and preferably, the flow velocity of the shearing phase in the second flow channels 2 in the interaction area is uniform to ensure uniform stress during the formation of the droplets.

In a specific embodiment, the first flow channel 1 and the second flow channel 2 have rectangular cross sections, the rectangular cross section has a length ranging from 0.7 mm to 2 mm, and a width ranging from 0.2 mm to 0.6 mm. For example, the first channel 1 and the second channel 2 form the cross structure. The sheared phase fluid flows in from the first flow channel 1, and the shearing phase fluid flows in from the two first flow channels 2 on the two sides of the first flow channel 1 respectively. Preferably, the viscosity ratio of the sheared phase fluid to the shearing phase fluid ranges from 10:1 to 30:1. Further, the viscosity of the sheared phase fluid ranges from 500 cp to 3000 cp. When the droplets are prepared, the flow rate of the fluid of the two phases can be controlled. For example, the flow rate ratio of the sheared phase fluid to shearing phase fluid in each of the second flow channels 2 at the intersection area ranges from 1:10 to 1:20. More preferably, the flow rate of the sheared phase fluid in the first channel 1 at the interaction area ranges from 10 µL/min to 40 µL/min, and the flow rate of the shearing phase fluid in each second channel 2 at the interaction area can range from 100 µL/min to 400 µL/min. By controlling the flow rate of the microfluidic chip in the specific embodiment, the droplets having diameters ranging from 200 µm to 400 µm can be obtained.

The present disclosure further performs simulation analysis on the volume fractions of the two phases and the applied shear force in the droplet generation process based on the flow channel of the cross structure.

Figure 6:
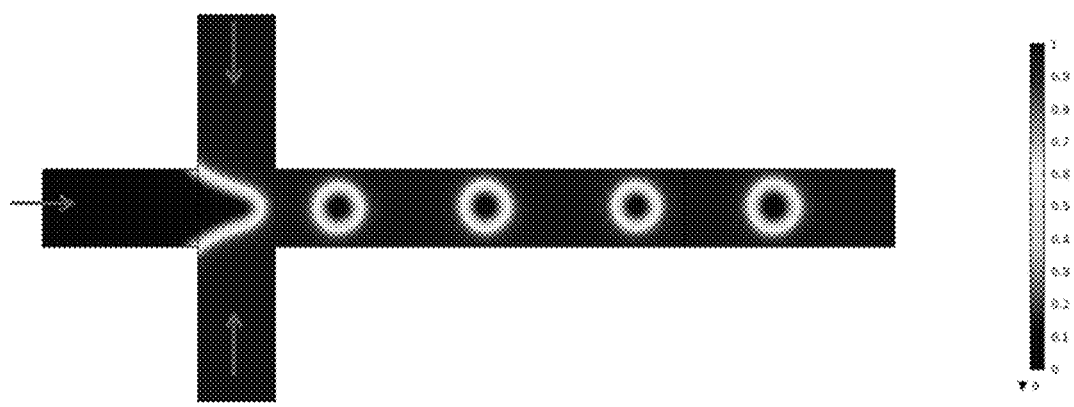
FIG. 6 is a schematic diagram of a volume fraction occupied by a dispersed phase solution and a continuous phase solution in a microsphere forming process of a microfluidic chip of the present disclosure.

FIG. 6 shows a simulation diagram of volume fractions of the two phases. The dispersed phase fluid flows in from one end of the first flow channel 1, and the continuous phase fluid flows in from the second flow channels 2 on the two sides, the continuous phase fluid gradually wraps the dispersed phase fluid in the interaction area, so that the dispersed phase fluid in the interaction area becomes an inverted conical portion, under the pressure of the dispersed phase fluid, the portion in the intersection area continues to flow forward, so that the inverted conical portion gradually deviates from the main beam under the shear of the continuous phase fluid, and finally the generated droplets flow toward the downstream of the interaction area. At this time, a certain amount of continuous phase fluid is still wrapped at the outside of the droplets, and meanwhile, the flow channel of the first flow channel 1 located at the downstream of the interaction area is filled with the continuous phase fluid to drive the discrete droplets to flow outward.

Figure 7:
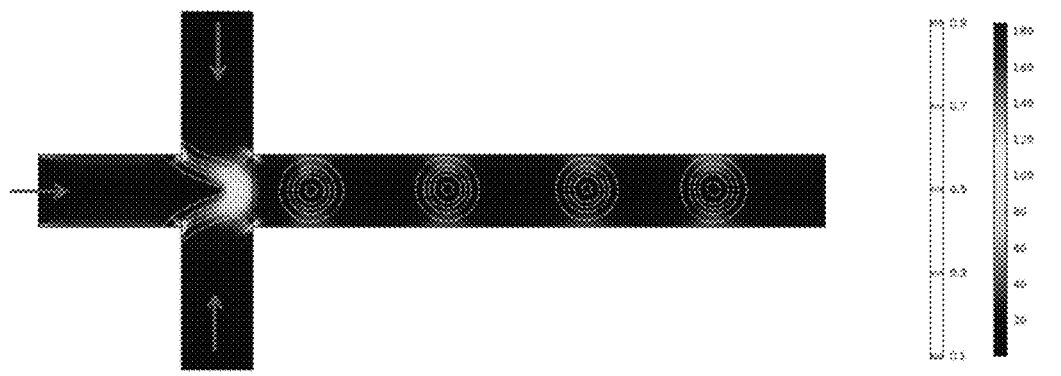
FIG. 7 is a schematic diagram of a shearing force applied in a microsphere forming process of a microfluidic chip of the present disclosure.

FIG. 7 illustrates a simulation diagram of the shear forces experienced during droplet formation. At the intersection area of droplet generation, in the lower portion of the inverted conical portion of the dispersed phase, the shear force is greater than the other portions due to the size decreased by the extrusion of the continuous phase fluid. Moreover, as the extrusion of the continuous phase fluid also exists on the two sides of the connection site of the inverted conical portion and the main stream of the dispersed phase fluid, the inverted conical portion and the main stream of the dispersed phase fluid are about to separate with the movement of the continuous phase fluid, so that the area is subjected to a greater shear force.

The contribution of the microfluidic chip of the present disclosure in improving the cell activity and increasing the yield will be explained below by way of specific embodiments. An experiment is carried out by taking the microfluidic chip having the cross structure as an example, and the continuous phase flow rate mentioned in the following various embodiments refers to the sum of the flow rates of the continuous phase fluid in the two second flow channels 2. The embodiments are as follows:

Experiment 1: a device with a flow channel size of 1 mm×0.3 mm is adopted, cell droplets with an average size of 220 μm can be obtained under dispersed phase viscosity of 2400 cp, a dispersed phase flow rate of 20 μL/min and a continuous phase flow rate of 300 μL/min, and the average cell activity is not less than 88%.

Experiment 2: a device with a flow channel size of 1 mm×0.3 mm is adopted, cell droplets with an average size of 350 μm can be obtained under dispersed phase viscosity of 2400 cp, a dispersed phase flow rate of 20 μL/min and a continuous phase flow rate of 200 μL/min, and the average cell activity is not less than 90%.

Experiment 3: a device with a flow channel size of 0.75 mm×0.3 mm is adopted, cell droplets with an average size of 300 μm can be obtained under dispersed phase viscosity of 1200 cp, a dispersed phase flow rate of 15 μL/min and a continuous phase flow rate of 150 μL/min, and the average cell activity is not less than 95%.

Experiment 4: a device with a flow channel size of 0.75 mm×0.3 mm is adopted, cell droplets with an average size of 200 μm can be obtained under dispersed phase viscosity of 1200 cp, a dispersed phase flow rate of 40 μL/min and a continuous phase flow rate of 800 μL/min, and the average cell activity is not less than 80%.

For comparison, in the microfluidic chip with a flow channel size of 0.5 mm×0.1 mm in the prior art, the flow channel for conveying the dispersed phase fluid is provided with a nozzle structure with an outlet of 60 μm in the intersection area, cell droplets with an average size of 180 μm can only be obtained under dispersed phase viscosity of 1200 cp, a dispersed phase flow rate of 2 μL/min and a continuous phase flow rate of 30 μL/min, and the average cell activity is not higher than 85%.

Four groups of experiments are performed on the microfluidic chip of the present disclosure and are compared with the prior art.

(1) The viscosity of the sheared phase:

In the prior art, when the dispersed phase viscosity is 1200 cp, the dispersed phase flow rate is 2 μL/min, if the dispersed phase viscosity is continuously increased, the shear difficulty of the continuous phase fluid to the dispersed phase fluid is increased, and the yield of the droplets is further reduced on the basis. In the embodiment of the present disclosure, when the dispersed phase viscosity is 2400 cp, the dispersed phase flow rate can still reach 20 μL/min. Therefore, for the dispersed phase fluid with high viscosity, the yield of the droplets can be improved while the cell activity is ensured.

(2) The sizes of the droplets:

The average size of the cell droplets produced by the flow channel in the prior art is 180 μm, while the average size of the cell droplets produced by the embodiment of the present disclosure is 200 μm, 220 μm, 300 μm and 350 μm, which conforms to the above-mentioned droplet size range of 200 μm to 400 μm, and the biological 3D printing requirements can be better met. Moreover, the greater the flow rate of the dispersed phase is, the greater the sizes of the generated droplets are, the greater the flow rate of the continuous phase is, the smaller the sizes of the generated droplets are, and by means of the integrated control of the flow rates of the flow rates of the two phases, the required sizes of the droplets can be obtained.

(3) Cell Activity:

The experiment 1 is compared with the experiment 2, in the case of the same size of the flow channels, the same viscosity of the dispersed phase and the same flow rate of the dispersed phase, the greater the flow rate of the dispersed phase is, the greater the shear force generated at the interaction area is, the greater the effect on the cell activity is, but both can meet the requirements of the 3D biological printing for the cell activity.

The experiment 3 is compared with the experiment 4, in the case of the same size of the flow channels and the same viscosity of the dispersed phase, the flow rate of the dispersed phase and the flow rate of the continuous phase are increased in the experiment 4 compared with the experiment 3. The increase of the flow rate of the dispersed phase can increase the friction of the fluid with the inner wall of the first flow channel 1, thereby increasing the shear force of the dispersed phase fluid during the flow; and the increase of the flow rate of the continuous phase can increase the shear force of the continuous phase fluid on the dispersed phase fluid, and the two factors have an effect on the cell activity. Therefore, the increase of the size of the flow channel is conducive to reducing the shear force of the dispersed phase fluid during the flow.

At the same time, the limit flow rates of the two phases are also obtained through the experiment 4, and under the limit flow rates, the cell activity can still meet the requirements of the 3D biological printing.

(4) The yield of the droplets:

Since the dispersed phase fluid is basically used for generating the droplets, the material waste is less, and thus the yield of the droplets can be evaluated by the consumption of the dispersed phase fluid. In the four experiments, the flow rate of the dispersed phase is 20 μL/min, 20 μL/min, 15 μL/min and 40 μL/min, while the flow rate of the dispersed phase is only 2 μL/min in the prior art, therefore the flow rate of the dispersed phase of the present disclosure is 7.5 times as large as that of the prior art, even up to 20 times, so that the yield of the droplets is greatly improved.

By means of the description of the above embodiment of the microfluidic chip, the present disclosure designs the fluid flow channel with the increased cross-sectional area of the flow channel, cancels the nozzle structure at the portion of the first flow channel 1 located upstream of the interaction area and performs flow rate control, so that the efficiency of generating the droplets by using the cell solution with high viscosity and the cell activity can be finally improved, thus meeting the needs of 3D biological printing. The microspheres be supplied at a faster rate for a 3D printing device, and the cell activity required for the 3D biological printing can also be met.

Therefore, the microfluidic chip can solve the problem of generating the large-size droplets (200 µm to 400 µm in diameters) by using cell-containing hydrogel with high viscosity (generally the viscosity of the sheared phase is much greater than that of the shear phase), and the yield is improved by 30% or more while the cell activity (60%-80% or more) is ensured.

In addition, the present disclosure further provides a droplet generation device, including the microfluidic chip in the above embodiment.

Preferably, the microfluidic chip is detachably provided. The arrangement facilitates the replacement of droplet microfluidic chips with different model numbers to change the diameters of the droplets so as to prepare microspheres of different sizes.

Further, in order to smoothly inject the shearing phase fluid and the sheared phase fluid into the corresponding flow channels, the microfluidic device of the present disclosure further includes a pumping device, the pumping device is communicated with the first flow channel 1 and the second flow channel 2, and is used for controlling the speed and the flow rate of the sheared phase fluid entering the first flow channel 1 and controlling the speed and the flow rate of the shearing phase fluid entering the second flow channel 2. The pumping device can be used for controlling the flow rate by controlling the pressure of the fluid, so that the flow rates of the two phases can be accurately controlled.

Further, the droplet generation device of the present disclosure further includes an input component, the input component is communicated with the inlets of the first flow channel 1 and the second flow channel 2, and is used for conveying the fluid for forming the droplets to the first flow channel 1 and the second flow channel 2. Or, the droplet generation device further includes an output component, the output component is communicated with the outlets of the first flow channel 1 and the second flow channel 2, and is used for outputting the formed droplets.

For example, the input component includes an input communication tube, and the input communication tube preferably includes an input capillary. The input component can be specifically divided into an input component for inputting the dispersed phase fluid and an input component for inputting the continuous phase fluid. For example, the output component includes an output communication tube, and the output communication tube preferably includes an output capillary.

Finally, the present disclosure further provides a microsphere preparation device, including the droplet generation device in the above embodiment. The general method of generating microspheres by the microsphere preparation device is as follows: firstly, injecting core liquid into a microfluidic chip to generate core liquid droplets; then correspondingly dripping the core liquid droplets onto the action surfaces of different collection holes for collecting a manufacture main body; and then forming the microspheres on the action surfaces of the collection holes based on the core liquid droplets.

Preferably, the microspheres are materials of biological ink for biological 3D printing, and the microspheres include cells.

The microsphere preparation device of the present disclosure can produce a non-layered single spherical structure or a layered spherical structure.

For example, the microsphere can be of a layered spherical structure that can include a layer of core and at least one coating layer for packaging the core. The core includes cells, the cells can perform growth, proliferation, differentiation or migration, and substances other than the cells in the core fluid are made of biodegradable materials and provide required substances for the life activities of the cells. The coating layer can be made of a biodegradable material and provides mechanical protection for the inner core and the cells, the preferred structure of the layered spherical structure can serve as the core component of the biological ink, namely, serving as a basic unit of the biological 3D printing.

The microspheres prepared by the present disclosure can be used in various fields such as bioprinting (such as 3D biological printing), tissue engineering, regenerative medicine, and the like.

The microfluidic chip and the control method thereof, the droplet generation device and the microsphere preparation device provided by the present disclosure have been described above in detail. The principles and embodiments of the present disclosure have been described via the specific embodiments, and the description of the above embodiments is only used for helping to understand the method of the present disclosure and its core idea. It should be noted that those of ordinary skill in the art can make several improvements and modifications to the present disclosure without departing from the spirit and scope of the present disclosure, and these improvements and modifications shall fall within the protection scope of the present disclosure.

The invention claimed is:

1. A microfluidic chip, comprising:
a matrix (3), and
a first flow channel (1) and a second flow channel (2) in the matrix (3), and the cross-sectional areas of the first flow channel (1) and the second flow channel (2) range from 0.1 mm$^2$ to 1 mm$^2$;
wherein the first flow channel (1) and the second flow channel (2) intersect to form an intersection area, such that a shearing phase fluid in the second flow channel (2) separate a sheared phase fluid in the first flow channel (1) into discrete droplets in the intersection area, and
wherein two second flow channels (2) are respectively provided on two sides of the first flow channel (1) to form a flow sandwiching focusing flow channel in the intersection area, each one of the second flow channels (2) is of an L-shaped structure in the intersection area, a vertical portion of the L-shaped structure is parallel to the first flow channel (1) and the vertical portion of the L-shaped structure and the first flow channel (1) are at a distance in the range of 0.1 mm to 20 mm.

2. The microfluidic chip according to claim 1, wherein the first flow channel (1) and the two second flow channels (2) form a cross structure in the intersection area.

3. The microfluidic chip according to claim 2, wherein a lateral portion of the L-shaped structure is communicated with the first flow channel (1) and is perpendicular to the first flow channel (1).

4. The microfluidic chip according to claim 1, wherein an included angle between the second flow channels (2) and the first flow channel (1) is less than 90°.

5. The microfluidic chip according to claim 1, wherein the first flow channel (1) and the second flow channel (2) have rectangular cross sections with a length ranging from 0.7 mm to 2 mm, and/or a width ranging from 0.2 mm to 0.6 mm.

6. The microfluidic chip according to claim 1, wherein the sheared phase fluid the sheared phase fluid has a viscosity in the range of 500 cp to 3000 cp.

7. The microfluidic chip according to claim 6, wherein the shearing phase fluid in the intersection area has a flow rate in the range of 100 μL/min to 400 μL/min, and the sheared phase fluid in the intersection area has a flow rate in the range of 10 μL/min to 40 μL/min.

8. The microfluidic chip according to claim 1, wherein each of the discrete droplets has a diameter ranging from 200 μm to 400 μm.

9. The microfluidic chip according to claim 1, wherein both ends of the two second flow channels (2) communicates with a common fluid inlet for the inflow of the shearing phase fluid, or the both ends of the two second flow channels (2) respectively communicates with two fluid inlets for the inflow of the shearing phase fluid.

10. The microfluidic chip according to claim 1, wherein a plurality of microfluidic units (N) are arranged in the matrix (3), each microfluidic unit (N) is provided with the flow sandwiching focusing flow channel, and the microfluidic units (N) are configured to work simultaneously or alternately.

11. A droplet generation device, comprising the microfluidic device according to claim 1.

12. The droplet generation device according to claim 11, further comprising a pumping device communicated with the first flow channel (1) and the second flow channel (2), for controlling a flow rate of the sheared phase fluid entering the first flow channel (1), and controlling a flow rate of the shearing phase fluid entering the second flow channel (2).

13. The droplet generation device according to claim 11, further comprising an input component communicated with an inlet of the first flow channel (1) and an inlet of the second flow channel (2), for conveying the sheared phase fluid for forming droplets to the first flow channel (1) and the second flow channel (2); or the droplet generation device further comprising an output component communicated with an outlet of the first flow channel (1) and an outlet of the second flow channel (2) for outputting the formed droplets.

14. A microsphere preparation device, comprising the droplet generation device according to claim 11.

15. A control method for use of the microfluidic chip according to claim 1, comprising providing a shearing phase fluid at a shearing phase fluid flow rate in each of the two second flow channels, providing a sheared phase fluid at a sheared phase fluid flow rate, controlling the shearing phase fluid flow rate and the sheared phase fluid flow rate such that a flow rate ratio of the sheared phase fluid to shearing phase fluid in in the intersection area ranges from 1:10 to 1:20.

16. The control method of the microfluidic chip according to claim 15, wherein the shearing phase fluid in each of the second channels (2) in the intersection area has a flow rate in the range of 100 μL/min to 400 μL/min, and the sheared phase fluid in the intersection area has a flow rate in the range of 10 μL/min to 40 μL/min.

17. The microfluidic chip according to claim 1, wherein a portion of the first flow channel (1) located upstream of the intersection area has a cross-section which is constant, or which gradually increases along a flow direction of the sheared phase fluid.

18. The microfluidic chip according to claim 1, wherein the sheared phase fluid and the shearing phase fluid have a viscosity ration in the range of 10:1 to 30:1; and/or the sheared phase fluid has a viscosity in the range of 500 cp to 3000 cp.

* * * * *